United States Patent [19]

Klein, Sr.

[11] 4,172,341

[45] Oct. 30, 1979

[54] FAUCET SEAT REFINISHER

[76] Inventor: Richard W. Klein, Sr., 202 S. Whiting St., Alexandria, Va. 22304

[21] Appl. No.: 890,396

[22] Filed: Mar. 27, 1978

[51] Int. Cl.² .................. B23C 1/20; B23D 67/12; B24B 24/06

[52] U.S. Cl. ................. 51/237 R; 29/76 R; 51/241 VS; 279/83; 403/362; 408/83.5

[58] Field of Search ............ 51/237 R, 241 VS, 237, 51/241; 90/12.5; 144/35 A, 35; 64/30 E, 30; 82/43, 44; 173/29, 46, 163; 269/48.1; 15/268; 81/71, 121 R, 52–121; 29/76 R, 76; 279/1 Q, 83; 403/362, 372

[56] References Cited

U.S. PATENT DOCUMENTS

| | | |
|---|---|---|
| 35,618 | 6/1862 | Mix . |
| 143,669 | 10/1873 | Combs . |
| 357,429 | 2/1887 | Walker . |
| 857,151 | 6/1907 | Booth . |
| 1,329,701 | 2/1920 | Ellsworth . |
| 1,603,478 | 10/1926 | Lees ............................ 51/241 VS |
| 1,647,802 | 11/1927 | Josef . |
| 1,923,611 | 8/1933 | Bozarth ......................... 51/237 R |
| 1,989,905 | 2/1935 | Albertson . |
| 2,092,941 | 9/1937 | Trefney et al. .................. 81/71 X |
| 2,302,853 | 11/1942 | Gordon ........................ 81/57.11 X |
| 2,822,714 | 2/1958 | Paparelli ........................... 81/71 |
| 2,914,332 | 11/1959 | Cervini . |
| 3,021,651 | 2/1962 | Fuller et al. . |
| 3,490,547 | 1/1970 | Stewart ....................... 173/163 X |
| 3,648,416 | 3/1972 | Ropers . |
| 3,906,683 | 9/1975 | Lepaw ......................... 51/237 R |

FOREIGN PATENT DOCUMENTS 1440820  6/1976  United Kingdom ................. 81/71

OTHER PUBLICATIONS

*Sioux Air and Electric Tools,* Catalog No. 71, Sioux Tools Inc., Sioux City, Iowa, pp. 39, 37 and 49.

*Primary Examiner*—Z. R. Bilinsky
*Attorney, Agent, or Firm*—John J. Byrne; Edward E. Dyson

[57] ABSTRACT

Disclosed is an electric tool particularly adapted for the grinding and refinishing of different sized and shaped faucet seats. The tool comprises an electric motor having a rotary output shaft, an adapter in the form of a double-ended chuck one end of which is sized to receive the rotary output shaft of the electric motor, and a plurality of mandrels each one of which comprises a stem sized to be received in the other end of the adapter and a working shaft sized and shaped to receive different sizes and/or shaped faucet seats. The electric motor may be either hand-held or bench mounted.

10 Claims, 10 Drawing Figures

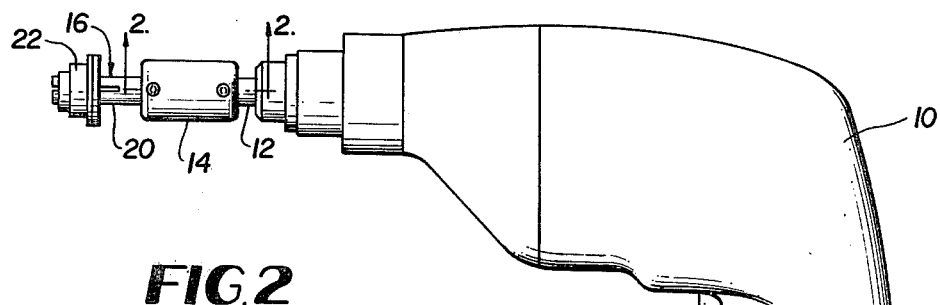
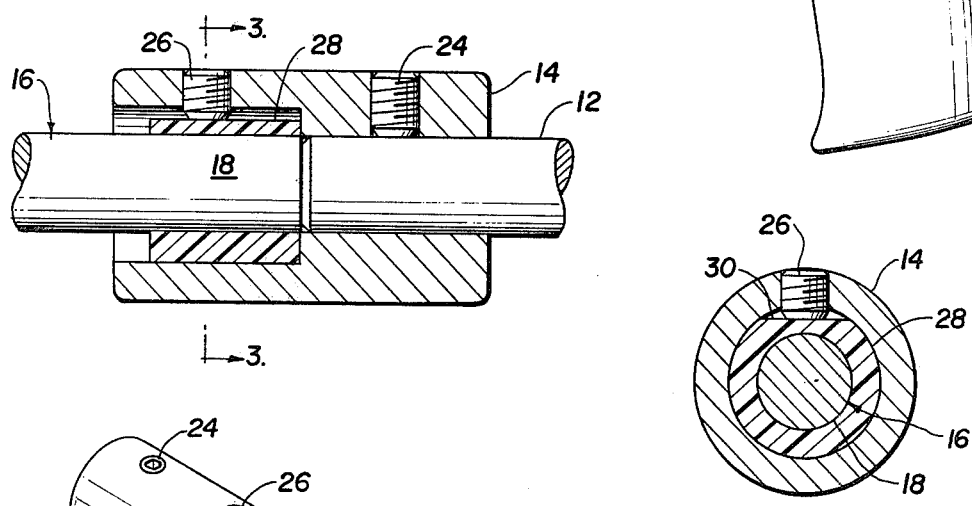
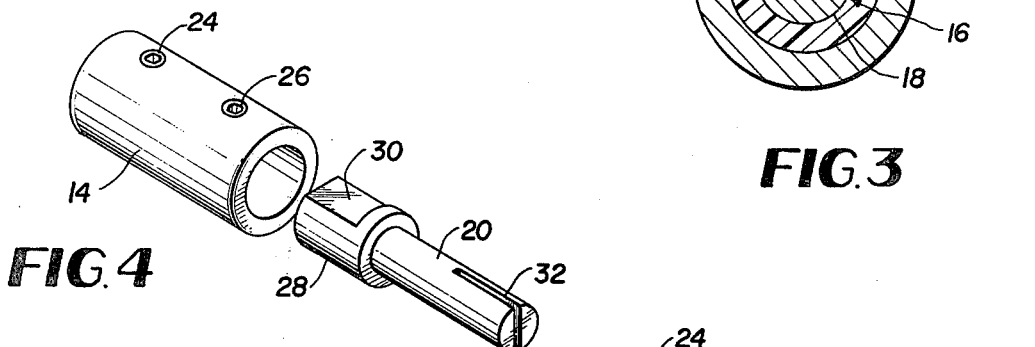
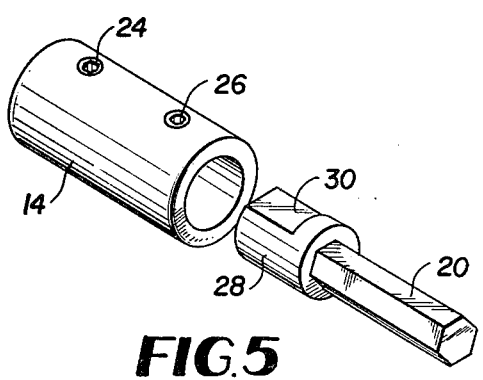
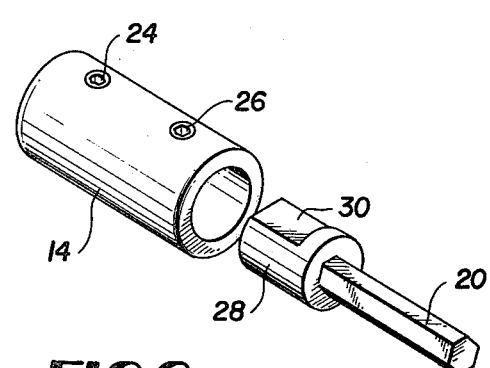

FAUCET SEAT REFINISHER

FIELD OF THE INVENTION

This invention pertains to the rotary grinding of work pieces. In particular, it pertains to the rotary grinding and refinishing of faucet seats.

BACKGROUND OF THE INVENTION

As is well known to any plumber, maintenance engineer, or home handyman, faucet seats become worn, nicked, and otherwise deformed in use, and from time to time they must either be refinished or be discarded and replaced by new faucet seats. The refinishing of faucet seats is not difficult if one has the proper tools, but, as is also well known to any plumber, maintenance engineer, or home handyman, faucet seats vary widely in size and shape, and, accordingly, even if one has the proper tool for refinishing one faucet seat, the chances are that it will be unsuitable for refinishing the next faucet seat one tries to use it on.

OBJECT OF THE INVENTION

It is, therefore, a primary object of this invention to provide a tool which will be suitable for refinishing a large number of differently sized and shaped faucet seats.

It is another object of this invention to provide such a tool which is portable and can be conveniently hand held or bench mounted.

It is a further object of this invention to provide such a tool which is inexpensive to manufacture and is sturdy in use.

Other objects and advantages of the present invention will become apparent from the following description of a preferred embodiment thereof taken in conjunction with the accompanying drawings.

BRIEF DESCRIPTION OF THE DRAWINGS

FIG. 1 is a side view of a hand-held embodiment of the subject invention.

FIG. 2 is a view along the line 2—2 in FIG. 1.

FIG. 3 is a view along the line 3—3 in FIG. 2.

FIG. 4 is a fragmentary perspective view showing one type of mandrel.

FIG. 5 is a fragmentary perspective view showing a second type of mandrel.

FIG. 6 is a fragmentary perspective view showing a third type of mandrel.

DETAILED DESCRIPTION OF THE PRESENTLY PREFERRED EMBODIMENT

Figure 7:
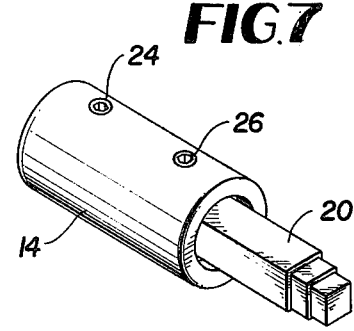
FIG. 7 is a fragmentary perspective view showing a fourth type of mandrel.

The hand-held electric tool shown in FIGS. 1-3 comprises a hand-held electric motor 10 having a rotary output shaft 12, an adapter 14 in the form of a double-ended chuck, and a mandrel 16. The hand-held electric motor 10 may be a conventional electric drill/screwdriver device, and, as many such motors are on the market and the particular type of motor used forms no part of my invention, it will not be described further herein. One end of the adapter 14 (the right-hand end in FIG. 2) is sized to receive the rotary output shaft 12 of the hand-held electric motor 10. As will be more apparent hereinafter, the mandrel 16 shown in FIGS. 1-3 is but one of a plurality of mandrels each one of which comprises a stem 18 sized to be received in the other end of the adapter 14 (i.e., the left-hand end in FIG. 2). Each of the plurality of mandrels also comprises a working shaft, denoted 20, which is sized and shaped to receive a different sized and/or shaped work piece which is to be rotated by the hand-held electric motor 10. In the context illustrated, of course, the work pieces are faucet seats, one of which is shown in FIG. 1 and denoted 22.

Although many different types of chucks are of course adaptable to this invention, the adapter 14 preferably simply contains two bores sized to receive the shaft 12 and the stems 18, respectively, while two set screws 24 and 26 are threadedly mounted in the adapter 14 in position to clamp the shaft 12 and one of the stems 18, respectively. As will be apparent, it is even possible to use a single through bore in the adapter 14 if the shaft 12 and the stems 18 are the same size, but that configuration is not preferred.

Although not critical to the invention, the stems 18 of all of the mandrels 16 are preferably identical in size and shape. Also, as shown in FIGS. 2 and 3, a resilient collar 28 having a flat side 30 adapted to cooperate with the set screw 26 is preferably mounted on each of the stems 18 of the mandrels 16. The resiliency of the resilient collars 28 permits the set screw 26 to grip the mandrels 16 more tightly than if the set screws impacted directly on the stems 18.

Figure 8:
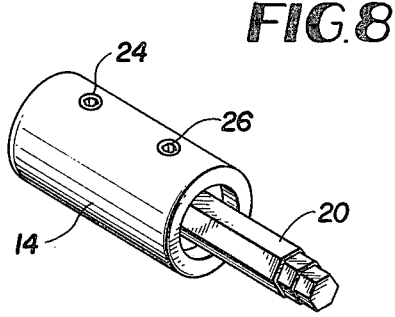
FIG. 8 is a fragmentary perspective view showing a fifth type of mandrel.
Figure 9:
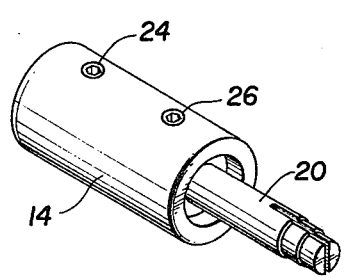
FIG. 9 is a fragmentary perspective view showing a sixth type of mandrel.

A number of individual mandrels are more clearly illustrated in FIGS. 4—9. As shown in FIG. 4, the working shaft 20 of at least one of the mandrels 16 is preferably cleft, as at 32, to facilitate slipping a workpiece over it. Also, as illustrated in FIG. 4, the working shaft 20 of at least one of the mandrels 16 is preferably circular in cross-section, and, as illustrated in FIGS. 5 and 6, which differ only in the size of the working shaft 20, the working shaft 20 of at least one of the mandrels 16 is preferably polygonal in cross-section. As illustrated in FIGS. 7-9, the working shafts 20 of others of the mandrels 16 are preferably stepped to accommodate different sized faucet seats. Of course, the sizes and shapes of the working shaft 20 of a set of mandrels 16 are chosen to accommodate as many as possible different types of faucet seats, or whatever other workpiece the tool is to be used with.

Figure 10:
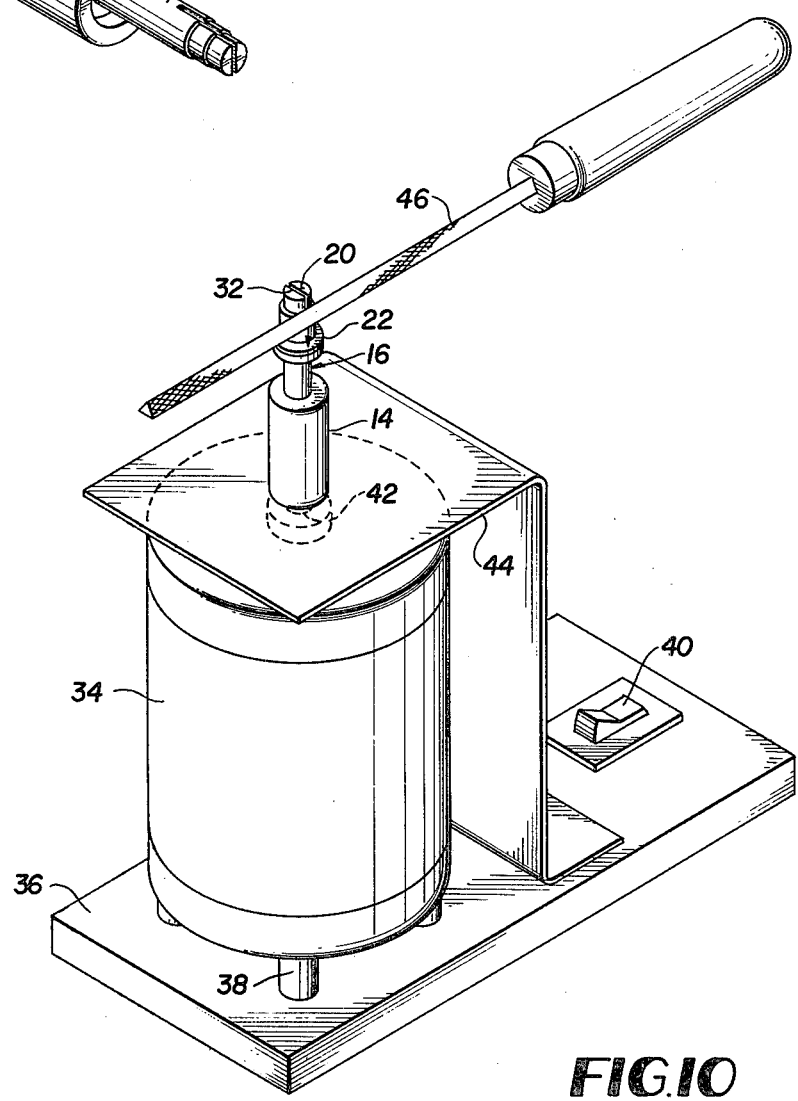
FIG. 10 is a perspective view of a bench-mounted embodiment of the subject invention.

A bench-mounted embodiment of the subject invention is shown in FIG. 10. This embodiment comprises a bench-mounted motor 34 (shown as elevated from a base plate 36 by four legs 38 to facilitate cooling of the motor) operable by a switch 40 and having a rotary output shaft 42. A shield 44 is provided to protect the motor 34 from workpiece filings. Otherwise, this embodiment is the same as the first embodiment described, and the same parts numbers are used to identify the various parts. This drawing also illustrates the use of a conventional three-sided file 46 to refinish the surface of the faucet seat 22.

CAVEAT

While the present invention has been illustrated by detailed descriptions of two preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. An electric tool for grinding and refinishing faucet seats, said tool comprising:
   (a) an electric motor having a rotary output shaft;
   (b) an adapter in the form of a double-ended chuck, said chuck having a first internal bore having a first diameter at one end and a second internal bore having a second diameter at the other end, said chuck releasably receiving the rotary output shaft of said electric motor in said first internal bore; and
   (c) a plurality of mandrels which are selectively releasably mountable in said adapter one at a time, each of said mandrels comprising a stem sized to be received in said second internal bore and a working shaft sized and shaped to receive different sized and/or shaped faucet seats, the working shaft of at least one of said mandrels being axially stepped to accommodate different sized faucet seats,
whereby a large variety of different sized and shaped faucet seats can be mounted on and rotated by the tool during grinding and refinishing.

2. An electric tool as recited in claim 1 wherein two set screws are threadedly mounted in said adapter in position to clamp the rotary output shaft of said electric motor and the stem of one of said mandrels, respectively.

3. An electric tool as recited in claim 2 and further comprising a resilient collar mounted on each of the stems of said mandrels.

4. An electric tool as recited in claim 3 wherein each of said collars has a flattened side to cooperate with one of said set screws.

5. An electric tool as recited in claim 1 wherein the stems of all of said mandrels are identical in size and shape.

6. An electric tool as recited in claim 1 wherein the working shaft of at least one of said mandrels is cleft to facilitate slipping a workpiece over it.

7. An electric tool as recited in claim 1 wherein the working shaft of at least one of said mandrels is circular in cross-section.

8. An electric tool as recited in claim 1 wherein the working shaft of at least one of said mandrels is polygonal in cross-section.

9. An electric tool as recited in claim 1 which is hand held.

10. An electric tool as recited in claim 1 which is bench mounted.

* * * * *

UNITED STATES PATENT AND TRADEMARK OFFICE
CERTIFICATE OF CORRECTION

PATENT NO. : 4,172,341
DATED : October 30, 1979
INVENTOR(S) : Richard W. Klein, Sr.

It is certified that error appears in the above-identified patent and that said Letters Patent are hereby corrected as shown below:

The correct address of the patentee is:

101 South Whiting
       Alexandria, Virginia 22304

Signed and Sealed this

Nineteenth Day of February 1980

[SEAL]

*Attest:*

SIDNEY A. DIAMOND

*Attesting Officer*     *Commissioner of Patents and Trademarks*